United States Patent [19]

deFasselle et al.

[11] 4,361,051
[45] Nov. 30, 1982

[54] FLOWMETER

[76] Inventors: Robert J. deFasselle, Timberridge Trail, Gates Mills, Ohio 44040; Craig R. deFasselle, 38411 Wood Rd., Willoughby, Ohio 44094

[21] Appl. No.: 208,630

[22] Filed: Nov. 20, 1980

[51] Int. Cl.³ .............................................. G01F 1/24
[52] U.S. Cl. .................................................. 73/861.54
[58] Field of Search ......................... 73/861.53, 861.54

[56] References Cited

U.S. PATENT DOCUMENTS

| | | | |
|---|---|---|---|
| 1,238,498 | 8/1917 | Dawley | 73/861.54 |
| 2,091,792 | 8/1937 | Neisemann | 73/861.54 |
| 2,459,689 | 1/1949 | Dickey | 73/861.54 |
| 2,523,666 | 9/1950 | Moth | 73/861.54 |
| 2,558,356 | 6/1951 | Greene | 73/861.54 |
| 3,224,270 | 12/1965 | Karol | 73/861.56 |
| 3,253,459 | 5/1966 | Sorenson et al. | 73/861.54 X |
| 3,691,834 | 9/1972 | deFasselle | 73/861.54 |
| 4,315,436 | 2/1982 | McCabe et al. | 73/861.54 |

Primary Examiner—Herbert Goldstein
Attorney, Agent, or Firm—Frijouf, Rust & Pyle

[57] ABSTRACT

An improved flowmeter is disclosed for measuring the flow rate of a fluid such as a gas or a liquid. The flowmeter comprises a body portion including a fluid inlet and a fluid outlet. A core tube is vertically disposed within the body portion to be in fluid communication with the fluid inlet. A tapered recessed groove extends along the core tube to provide a fluid path adjacent the core tube in fluid communication with at least the fluid outlet of the body portion. A piston is located within the core tube to expose a variable amount of the tapered recessed groove to the fluid inlet upon movement of the piston within the core tube. The fluid flow moves the piston relative to the recessed groove to an equilibrium position determined by a single cross-sectional area of the tapered recessed groove for a given flow. Means are provided for indicating the position of the piston for determining the volumetric flow rate of the fluid.

5 Claims, 29 Drawing Figures

U.S. Patent  Nov. 30, 1982  Sheet 1 of 4  4,361,051
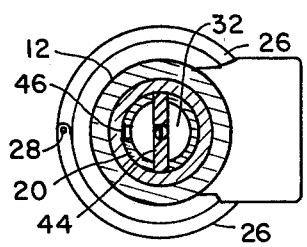
FIG. 4
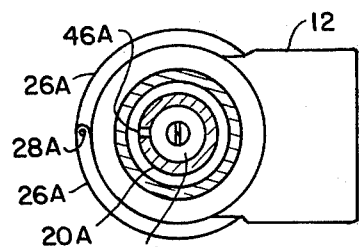
FIG. 7
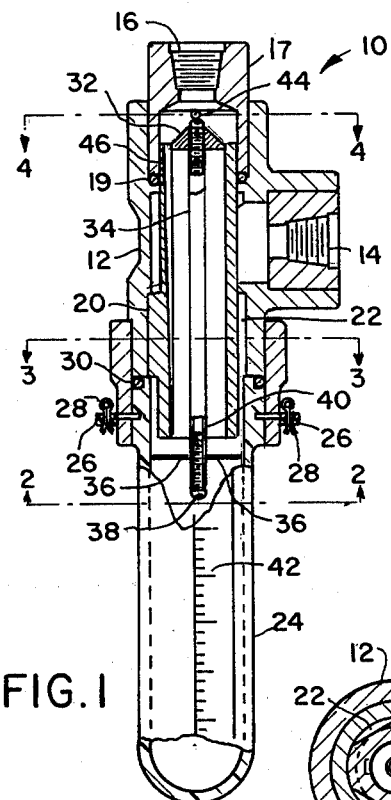
FIG. 1
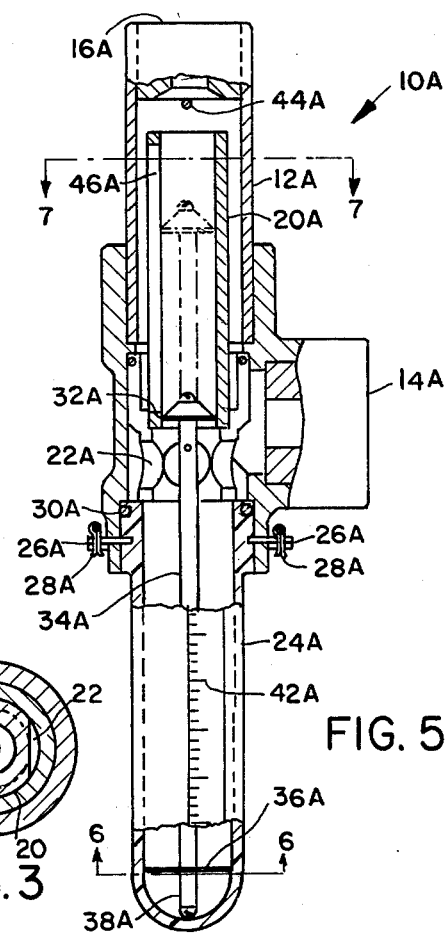
FIG. 5
FIG. 3
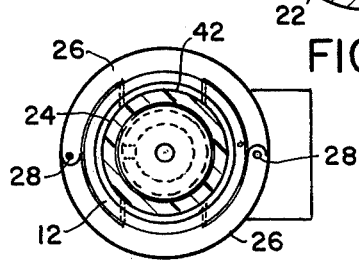
FIG. 2
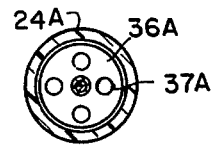
FIG. 6

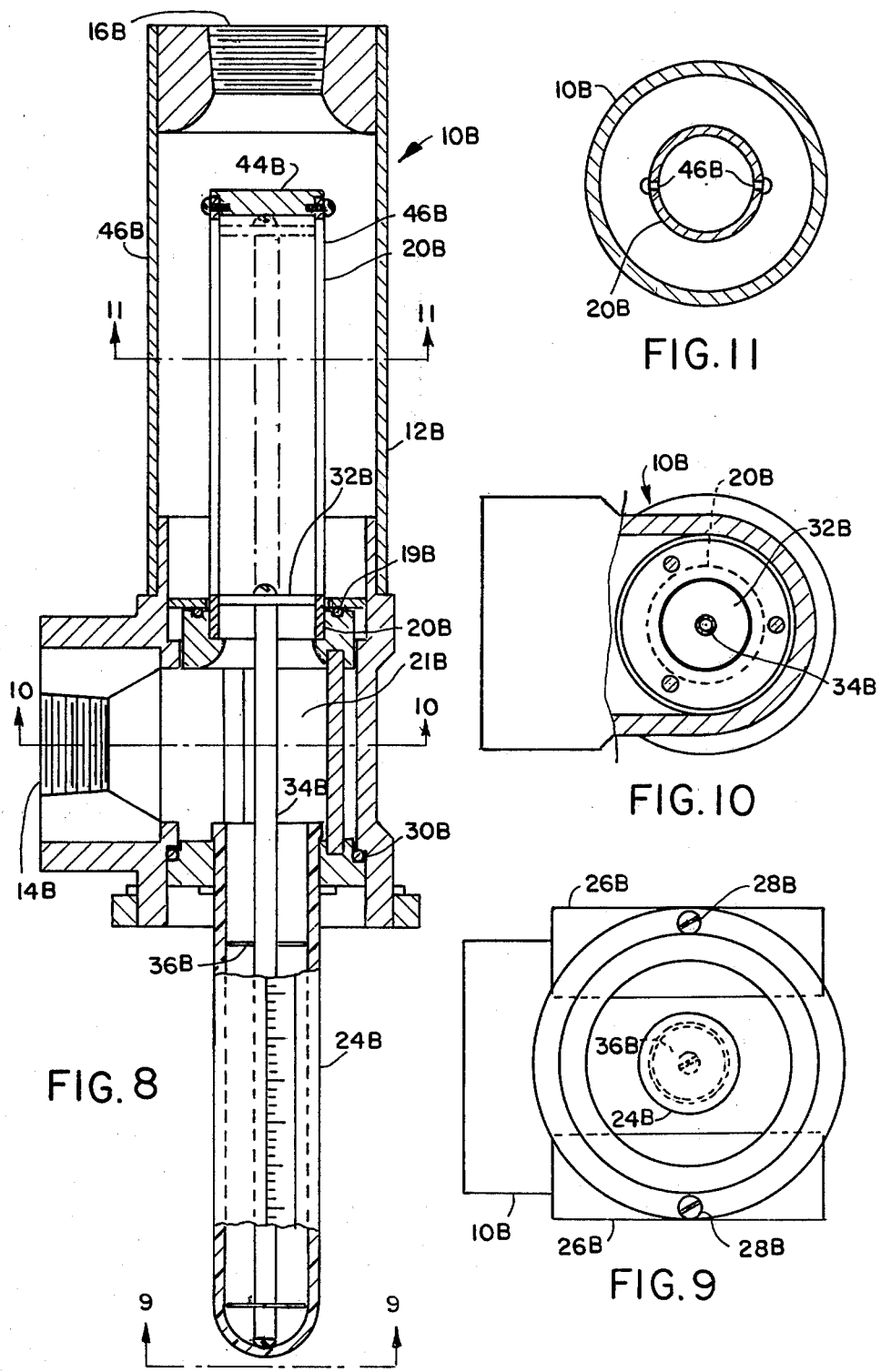

FLOWMETER

CROSS REFERENCE TO RELATED APPLICATION

This application is an improvement of my prior patent, U.S. Pat. No. 3,691,834.

BACKGROUND OF THE INVENTION

1. Field of the Invention

This invention relates to flowmeters and more particularly, to flowmeters utilizing a variable area.

2. Background of the Invention

This invention relates to flowmeters of the type known as a variable area flowmeter. This type of flowmeter provides a weighted member movably disposed across an orifice such that the position of the weighted member determines the orifice area. The weighted member provides an essentially constant fluid head against the fluid entering the system so that the displacement of the weighted member is essentially a linear relation with the rate of volumetric flow of the fluid.

The principal advantage of a variable area flowmeter is that, at low cost, it provides a wide range of capacity with low system resistances and is essentially linear. One well known and popular form of variable area flowmeter, often called a rotameter, utilizes a weight moving vertically within a tapered tube, usually transparent, whose area increases upwardly. Among the disadvantages of this system is the inability to see the float and to read the flow when hidden by dark fluids in larger diameters toward the top of the tube. Rotameters are also subject to instability in the transition zone between laminar and turbulent flow and in many cases, viscosity influences the float response within the meter. These factors often limit accurate low end reading of rotameters to 8-12 percent of the total capacity. Certain desirable methods of applying a transducer for readout and control are limited by the geometry of a rotameter and for large flow rates, rotameters are large and costly. Finally, rotameters often experience severe float pulsation particularly with low density gas media.

Another proven variable area flowmeter is described in my prior U.S. Pat. No. 3,691,834. This invention overcomes many of the disadvantages of the rotameter. The U.S. Pat. No. 3,691,834 invention utilizes a snorkel for liquid media. The snorkel device adds cost, and requires a built-in minimum meter pressure drop to function. The snorkel, under some circumstances, may introduce an exponential flow factor which particularly limits wide range low capacity meter designs. In addition, the "thru slot" orifice configuration is difficult to construct in widths narrow enough to provide low capacity meters. In actual practice with metal core tubes and floats, full range capacities below about 1.2 gallons per minute for liquids and 7.0 standard cubic feet per minute for gases have been demonstrated impractical within competitive costs. Extreme float pulsation with low density gas media have been observed with the design, thus limiting the commercial application of this design.

It is a principal objective of this invention to provide a variable area flowmeter utilizing a float within and extending from a vertically oriented cylindrical within an orificed core tube which overcome deficiencies in the prior art.

Another object of this invention is to provide a variable area flowmeter utilizing tapered slot means and slots of various geometries producible without sophisticated machinery to allow full range capabilities in terms of flow rate.

Another object of this invention is to provide a variable area flowmeter wherein an effective pulsation damping means is provided therein without the cost and complications of a pitot or snorkel as found in my prior patent, U.S. Pat. No. 3,691,834.

Another object of this invention is to provide a variable area flowmeter which also eliminates unwanted flow components and the built-in pressure drop requirements inherent to the pitot or snorkel tube.

Another object of this invention is to provide a variable area flowmeter which generates signals for remote readout flow control and the like without sacrifice of inherent visual readout at the meter.

Another object of this invention is to provide a variable area flowmeter which is linear for an extremely wide variation in flow rates and density of fluid materials.

Another object of this invention is to provide a variable area flowmeter with means to provide departure from linearity when desired over full or upper range in either increasing or decreasing increments of displacement per unit of flow rate increase.

Another object of this invention is to provide a variable area flowmeter with a demonstrated accurate flow rate reading to one percent (1%) of full capacity.

The foregoing has outlined some of the more pertinent objects of the invention. These objects should be construed to be merely illustrative of some of the more prominent features of the intended invention. Many other beneficial results can be attained by applying the disclosed invention in a different manner of modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with specific embodiments shown in the attached drawings. For the purpose of summarizing the invention, the invention may be incorporated into a flowmeter for measuring the flow rate of a fluid comprising a body portion including a fluid inlet and a fluid outlet. The body portion is vertically disposed to receive a vertically disposed core tube located within the body portion in fluid communication with the fluid inlet. Recess groove means extends along the core tube to provide a fluid path adjacent the core tube. The recess groove or slot means is in fluid communication with at least the fluid outlet of the body portion. A piston is located within the core tube to provide a variable amount of cross-sectional area of the recess groove to the fluid inlet upon movement of the piston along the core tube. When fluid flow rate changes, a momentary pressure change moves the piston along the core tube to expose a different orifice area to restore equilibrium which exists when the fluid pressure within the core tube exactly equals the pressure exerted by the piston. Means are provided for indicating the position of the piston for determining the flow rate of the fluid.

In a more specific embodiment of the invention, the fluid output is located above the fluid input whereby the piston is forced upwardly with the indicator and damper being positioned below the piston. This is in contrast to my prior patent wherein the damper or indicator was positioned above the piston. In a similar manner, the core tube is oriented to be concentric with the body portion creating an annular space therebetween. In this invention, one end of the core tube is sealed into the body portion thereby requiring all fluid entering the fluid inlet to flow through the core tube and recess groove means. In one embodiment, the recess groove means includes a tapered groove having a variable cross-sectional area along the length of the core tube. In another embodiment, the recess groove means includes a through slot extending through the core tube.

A sight tube or cover tube is secured to the lower region of the body portion for encompassing the indicator or damper. A scale may be fixed to the sight tube for cooperation with the indicator to provide a visual indication of the fluid flow rate. The advantage of this invention over the prior art includes the damper or the indicator being disposed below the piston. This enables the indicator or damper to be damped by the fluid contained within the cover or sight tube which enters the fluid inlet.

For gaseous fluids, a damping liquid may be inserted into the cover tube to dampen the action of the piston when measuring a gaseous fluid. Accordingly, the present invention eliminates the need or requirement for a pitot or snorkel tube as found in my prior patent.

Various forms of indicating means may be incorporated with the present invention. In one embodiment, the indicating means includes a magnetic means for sensing the position of the piston. The magnetic means may be coupled through a non-magnetic material to a magnetic indicator for giving a visual indication of the position of the piston. In another embodiment, the magnetic means may include a linear variable differential transformer. In still another embodiment, the magnetic means may include a plurality of magnetic switches disposed along the path of movement of a magnetic indicator for activating electrical circuits in accordance with the position of the indicator. Photoelectric or radiation type indicators are also suitable for use with the present invention.

The foregoing has outlined rather broadly the more pertinent and important principles of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is an elevation view partially in section of a first embodiment of the flowmeter for measuring low flow rates of liquids and dense gases;

FIG. 2 is a sectional view taken along line 2—2 of FIG. 1;

FIG. 3 is a sectional view taken along line 3—3 of FIG. 1;

FIG. 4 is a sectional view taken along line 4—4 of FIG. 1;

FIG. 5 is an elevation view partially in section of a second embodiment of the flowmeter for measuring medium flow rates of liquids and dense gases;

FIG. 6 is a sectional view taken along line 6—6 of FIG. 5;

FIG. 7 is a sectional view taken along line 7—7 of FIG. 5;

FIG. 8 is an elevation view partially in section of a third embodiment of the flowmeter for measuring low to high flows of low density gases and with very low flow resistance;

FIG. 9 is a sectional view taken along 9—9 of FIG. 8;

FIG. 10 is a sectional view taken along line 10—10 of FIG. 8;

FIG. 11 is a sectional view taken along line 11—11 of FIG. 8;

Similar character references refer to similar parts throughout the several views of the drawings.

DETAILED DESCRIPTION

Figures 12, 13, 14A, 14B, 14C, 15, 16, 17A, 17B, 17C:
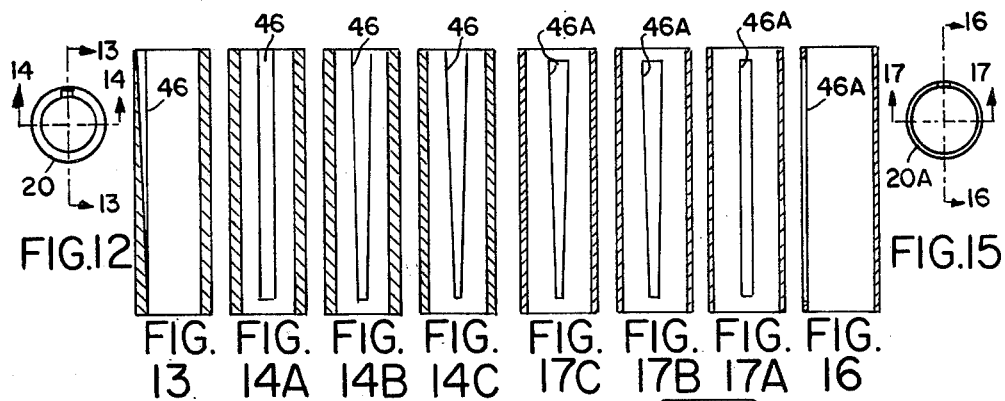
FIG. 12 is a top view of a core tube utilized in FIGS. 1-4.
FIG. 13 is a sectional view taken along line 13—13 of FIG. 12 showing in greater detail the tapered recess.
FIGS. 14A, 14B and 14C illustrate various modifications of the recess as seen from section line 14—14 of FIG. 12.
FIG. 15 is a top view of a through slot core tube as illustrated in FIG. 5.
FIG. 16 is a sectional view along line 16—16 of FIG. 15.
FIG. 17A-C illustrates various modifications of the recess as seen from the section line 17—17 of FIG. 15.

FIGS. 1-4 illustrate a first embodiment of the invention which is an improvement upon my prior U.S. Pat. No. 3,691,834. In many respects, the instant invention operates in a manner similar to my prior patent and accordingly the explanations of linearity and the like will be incorporated by reference into the instant specification.

The flowmeter 10 comprises a body portion 12 which may be constructed of a plastic or metallic material and may be constructed from standard PVC, sockets, tees, pipes, rods and the like. The body portion comprises a fluid inlet 14 and a fluid outlet 16 with the fluid inlet 14 being disposed below the fluid outlet 16. In this embodiment, the fluid outlet comprises a separate threaded fitting 17 sealed by conventional means such as solvent cementing, but it is understood that the unit may incorporate an integral output member.

A core tube 20, being of a substantially cylindrical configuration, is mounted to be coaxial with the body portion and forming a seal at O-ring 19 while insuring that all fluid entering the input 14 flows through the core tube 20. Input passageways 22 enable the input fluid to flow between the body portion 12 and the outer surface of the core tube 20 to enter a region defined by a cover tube or sight tube in transparent versions which define the region below the core tube 20. The physical positioning of the cover tube 24 below the fluid inlet 14 insures that liquid fluid will always flow through liquid passage 22 to entirely fill the cover tube 24 prior to flowing through the core tube 20. The significance of this aspect of the invention will become apparent from the following description.

The cover tube 24 is secured to the body portion 12 by plural lock rings 26 secured together with pins 28 but it should be understood that various other means may be utilized for securing the cover tube to the body portion. An O-ring 30 insures proper sealing between the cover tube 24 and the body portion 12.

The flowmeter 10 also includes a piston 32 which is movably mounted within the core tube 20 and connected by a tubular connector 34 to an indicator and damper 36. The piston 32 is selected to slide freely within the core tube 20 without substantial loss of the fluid flow therebetween. The indicator or damper 36 is illustrated as a flat disc-shaped member which is free to slide within the cover tube 24 yet allow fluid to flow therearound. In some applications, apertures drilled in the indicator or damper disc 36 as shown in FIG. 6 may be suitable for various measurements.

The tubular connector 34 includes an adjustment screw 38 which may be threadably inserted and removed from the tubular connector in order to add mass shown as shot 40 to the tubular member to calibrate the weight of the piston unit comprising piston 32, tubular connector 34 and indicator or damper 36 relative to a scale 42 which is located in a fixed position relative to the cover tube 24. The lower motion of piston 32 is fixed by the bottom of screw 38 contacting the bottom of the cover tube 24 whereas the top movement of the piston is fixed by a stop rod 44.

An important aspect of the present invention is the use of a tapered recessed groove 46 which tapers from a small cross-sectional area near the lower portion of the core tube 20 to a larger cross-sectional area in the upper portion of the core tube. The use of a tapered recessed groove improves the low volume flow at full capacity over my prior U.S. Pat. No. 3,691,834. In addition, the inverted nature of the cover tube 24 and the fact that the indicator or damper 36 is always immersed in a fluid when liquid is being used, eliminates the requirement of the pitot tube or snorkel as required in my prior patent. The two important distinctions have resulted in a large turndown ratio enabling the flowmeter to have wide applications in the art. Presently, a 25 gallon per hour flowmeter of the rotameter type is usually incapable of reading flow rates below 2-3 gallons per hour. The flowmeter disclosed in the first embodiment of my invention has demonstrated the capability of measuring flow rates down to 0.25-0.50 gallons per hour for the same 25 gallon per hour full capacity flowmeter. The improvements of my new invention are readily apparent over the prior art, including my own U.S. Patent.

FIGS. 5-7 illustrate a second embodiment of my invention which utilizes a through slot core tube and provides a different fluid input which is more suitable for use in measuring medium flow rates of liquid and dense gases. Similar parts are labeled with similar reference numerals followed by the letter A as in FIG. 1. In this second embodiment, the flowmeter 10A comprises a body portion 12A having a fluid inlet 14A and a fluid outlet 16A. A core tube 20A is concentrically disposed in body portion 12A with an input passage 22A shown as a plurality of apertures connecting the fluid inlet 14A with the internal area of the core tube 20A. A cover tube 24A is secured by similar locking rings 26A to the body portion 12A with an O-ring seal 30A. A piston 32A is similarly disposed upon a tubular connector 34A to the indicator or damper 36A. In this embodiment, the damper 36A includes an optional plurality of apertures 37A for lessening the damping action thereof, if desired.

In this embodiment, the recessed groove 46A is a through slot in a manner similar to my prior patent. However, the unique feature of the cover tube or sight tube 24A located below the body portion 12 and the fluid inlet 14A similarly eliminates the requirement for the pitot tube or snorkel, thus adding to the desirability of the instant invention. Turndown ratios in excess of 50 to 1 have been demonstrated.

FIG. 8 illustrates still a further embodiment of my invention showing a flowmeter particularly suited to measuring low to high flows of low density gases with very low fluid resistance. In a similar manner, similar parts are labeled by similar reference numerals followed by the letter B. In this embodiment, the flowmeter 10B utilizes the body portion 12B having a fluid inlet 14B and a fluid outlet 16B. In this embodiment the input passage is eliminated and a plenum 21 is utilized for the high flow rate gas. A cover tube 24B is similarly secured to the body portion with the core tube 20B receiving piston 32B connected by tubular connector 34B to the indicator or damper 36B. In this embodiment, stop rod 44 is replaced by a stop cap 44B with plural through slots 46B being disposed on opposed sides of the core tube 20B. Lock rings 26 are replaced with lock bars 26B and pins 28 with screws 28B. The invention shown in FIGS. 8-11 has the distinct advantage of enabling a liquid to be placed within cover tube 24 while a gas fluid is measured entering input 14B. The damping liquid within the cover tube 24B enables the positive damping of piston 32 while the flow rate of the gas is measured entering the fluid inlet 14B. The present invention enables a gas/liquid cooperation for measuring the flow rate of gases in a properly damped manner which was totally impossible with my prior Patent. The open end of the cover tube extends upwardly into the plenum and may extend further. This prevents carry-over of damping into the flowing media as could occur if the damping fluid foams as may happen with gas media of varying pressure. Turndown ratios of 100 to 1 have been demonstrated with this embodiment.

The operation of the flowmeters shown in FIGS. 1-11 should be apparent from the foregoing discussion and also in view of the disclosure of my prior patent. Essentially, the mass of the piston tubular connector and the indicator or damper provides a constant head against which the fluid pressure exerts a force to raise the piston in core tube 20. The piston is raised until the cross-sectional area of the recessed groove provides a release of pressure fluid to equilibrium with the piston exerted pressure thereby providing a unique and single position of the indicator or damper with respect to the scale for a given fluid flow. The range, turndown ratio and full capacity for a particular application requirement are achieved by proper design of piston weight, slot area and slot geometry. The use of a cover tube below the fluid inlet enables the fluid in terms of a liquid or gas to operate on both sides of the damper in addition to enabling the liquid/gas interface as described with reference to FIG. 8. It should be appreciated by those skilled in the art that such liquid/gas interface is not limited to the embodiment shown in FIG. 8 but is equally applicable to all the embodiments of the present invention.

FIG. 12 is a top view of a core tube which is utilized to show in greater detail the sections taken for FIGS. 13 and 14. FIG. 13 is a side sectional view along line 13—13 showing in greater detail the tapered groove shown in FIG. 1. FIG. 14A is a view along line 14—14 of the tapered groove 46. FIG. 14B is another variation of the tapered groove wherein the groove is tapered in two dimensions, namely the dimension as shown in FIG. 13 in addition to the dimension shown in FIG. 14B. It should be appreciated that such variation is a linear variation of area. FIG. 14C illustrates a curved or exponential variation in the dimension shown in FIG. 14B but a linear variation in the taper as shown in FIG. 13.

FIG. 15 is a top view of a core tube having a through aperture as shown more clearly in FIG. 16 which may be suitable for the flowmeters shown in FIGS. 5 and 8. In this embodiment, FIGS. 17A-17C illustrate various variations of the taper of recess slot 46. FIG. 17A illustrates a linear dimension of slot 46 whereas FIG. 17B illustrates a linear taper whereas FIG. 17C illustrates an exponential taper of the through slot 46. Numerous variations and combinations of these slots may be provided for each of the various embodiments of this invention. Such variations should be construed as within the scope of the disclosed invention.

Figure 18:
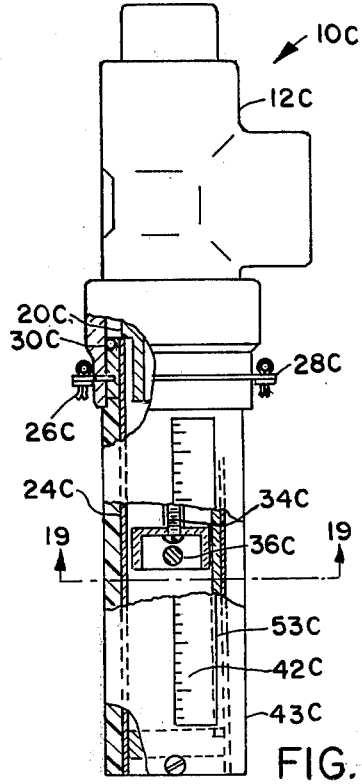
FIG. 18 is a modification of the invention utilizing a magnetic indicator means.
Figure 19:
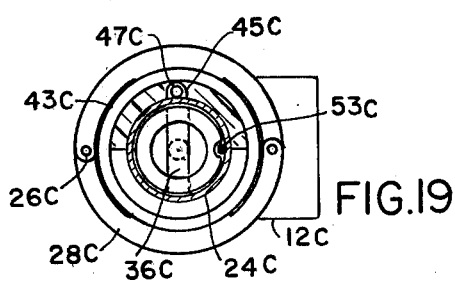
FIG. 19 is a sectional view along line 19—19 of FIG. 18.

FIGS. 18 and 19 show a modification of the invention utilizing a magnetically linked indicator means. In many instances, the application precludes the use of a transparent plastic or glass cover tube but a mechanical indication of the flow rate is desirable. In this embodiment the cover tube 24C comprises a metallic but non-magnetic material with the indicator 36C comprising a magnet fixed relative to the tubular connector 34C. A scale 42C is disposed on the outer periphery of a transparent half-tube 43C encircling the cover tube 24C. The transparent half-tube 43C includes a slot 45C extending along the length of the transparent tube 43C. Captive, but freely vertically movable in slot 45C is a ball of magnetic material 47C which positions itself adjacent the magnet indicator 36C by virtue of the magnetic field propagating through the non-metallic cover tube 24. Accordingly, a mechanical and visual indication of the metallic ball 47C is given relative to the scale 42C by action of the magnetic field of the indicator 36C through the non-magnetic cover tube 24C.

Figure 20:
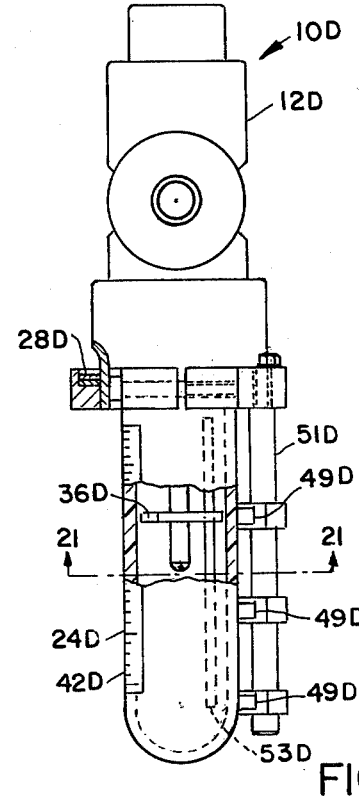
FIG. 20 is another variation of the invention utilizing magnetic switch means.
Figure 21:
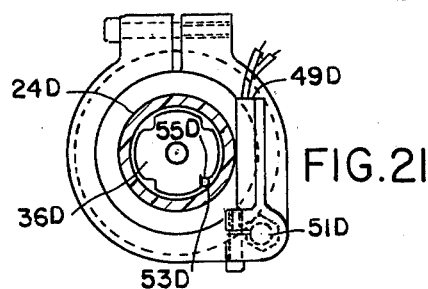
FIG. 21 is a sectional view along line 21—21 of FIG. 20.
Figure 22:
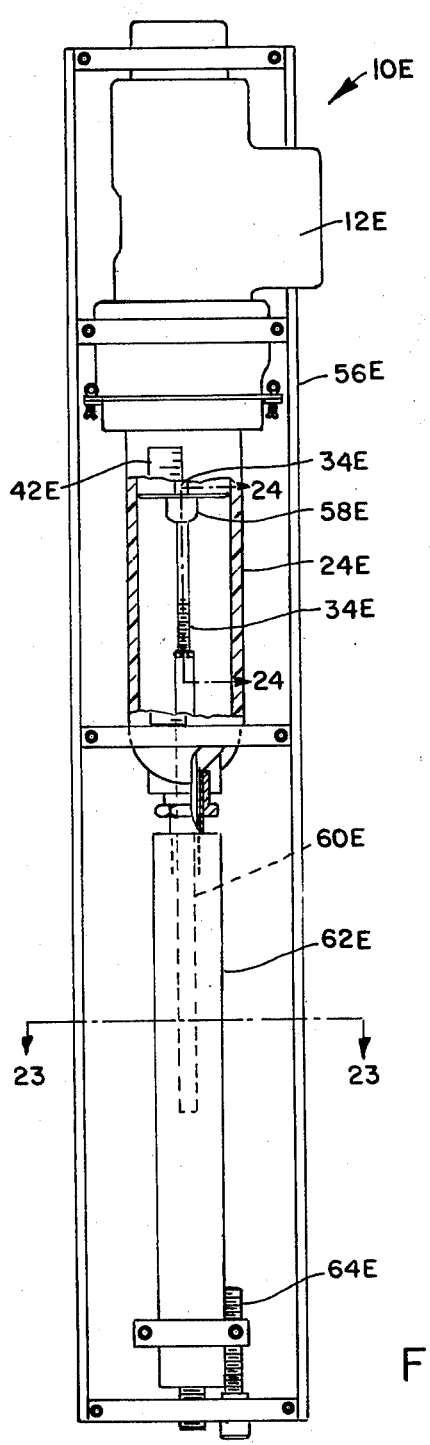
FIG. 22 is another variation of the invention utilizing a magnetic means comprising a linear variable differential transformer.
Figure 23:
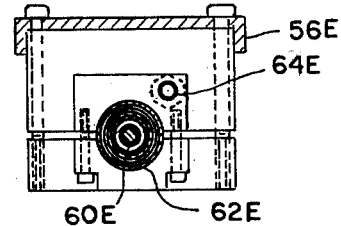
FIG. 23 is a sectional view along line 23—23 of FIG. 22.

FIGS. 20 and 21 illustrate a further modification of the magnetic means wherein a magnetic indicator or damper 36D gives a visual indication of the flow rate relative to a scale 42D disposed upon a transparent cover tube 24D. In addition thereto a plurality of magnetic switches 49D are positioned adjacent the non-metallic transparent cover tube 24 for providing external signals depending upon the position of the magnetic switches and the position of the indicator or damper 36D. It should be apparent that the magnetic switches may be adjustably moved vertically for flow range adjustment, horizontally (arc) for differential adjustment, on an adjustment rod 51D. An index rod 53D cooperates with an indent 55D in the indicator 36D for maintaining the proper orientation of the magnet in damper 36D. A similar arrangement is shown with respect to FIGS. 18 and 19.

Figure 24:
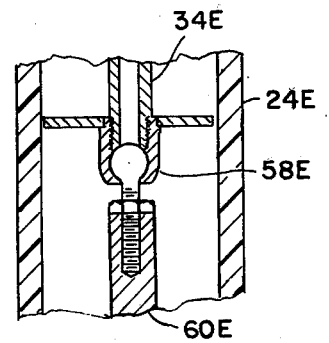
FIG. 24 is a sectional view showing a detailed coupling of FIG. 22.
Figure 25:
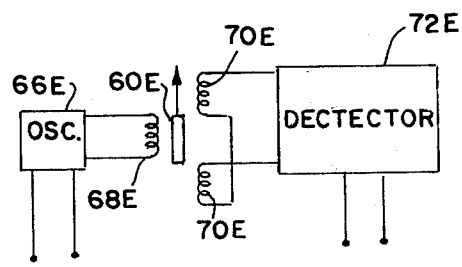
FIG. 25 is a schematic diagram of an electronic circuit for the magnetic sensor of FIG. 22.

FIGS. 22-25 illustrate a further variation of the invention wherein the flowmeter 10E actuates a linear variable differential transformer. In this embodiment, the entire body portion 12E of the flowmeter 10E is enclosed within a housing 56E with the tubular connector 34E coupled through a ball joint 58E as shown in FIG. 24, to a core 60E of a linear variable differential transformer 62E. An adjustment screw 64E is provided for adjusting the relative position of the transformer relative to the flowmeter 10E. The position of the piston (not shown) within the flowmeter 10E determines the position of the core 60E relative to the transformer 62E. FIG. 25 illustrates a brief schematic diagram of the linear variable differential transformer wherein current is applied to oscillator 66E to provide a constant voltage at high frequency to the input driving coil 68E. Sensor coils 70E sense the position of magnetic core 60E to provide the detector 72E with data for determining the position of the piston within the flowmeter 10E. Various types of logic and control circuits 72E may be utilized with the invention as set forth herein.

The foregoing has disclosed novel improvements of my prior patent and the prior art wherein the turndown ratio of flowmeters has been substantially increased and the resultant flowmeter construction has been greatly simplified. The reliability of the flowmeter has been increased and the manufacturing costs have been substantially decreased. It should be noted that all of the various variations of the instant invention may be interchanged for various applications which should be well known to those skilled in the art.

The present disclosure includes that contained in the appended claims as well as that of the foregoing description. Although this invention has been described in its preferred form with a certain degree of particularity, it is understood that the present disclosure of the preferred forms have been made only by way of example and that numerous changes in the details of construction and the combination and arrangement of parts may be resorted to without departing from the spirit and scope of the invention.

Now that the invention has been described, we claim:

1. A flowmeter for measuring the flow rate of a fluid, comprising in combination:
   a body portion including a fluid inlet and a fluid outlet;
   a fluid path extending between said fluid inlet and said fluid outlet;
   a core tube disposed vertically within said body portion defining a recessed groove means extending along said core tube;

first piston means movably disposed within said core tube;

said first piston means being disposed adjacent to said recessed groove means;

said recessed groove means and said first piston means defining therebetween a cross-sectional area of said fluid path;

said cross-sectional area of said fluid path being variable dependent upon the longitudinal disposition of said first piston means relative to said recessed groove means;

a cover tube disposed adjacent said body portion and in fluid communication with said fluid path;

a second piston means movably disposed within said cover tube;

means connecting said second piston means to move in unison with said first piston means;

said second piston means being immersed in static fluid in said cover tube enabling said static fluid to be disposed on a first and a second side of said second piston means;

aperture means in said second piston means for enabling controlled fluid flow through said aperture means upon movement of said first piston means for damping the movement thereof; and an indicator means cooperating with said second piston means for indicating the position thereof relative to said cover tube to indicate the fluid flow rate between said fluid inlet and said fluid outlet.

2. A flowmeter as set forth in claim 1, wherein said fluid outlet is located above said fluid inlet;

said means for indicating the position of said piston means is disposed below said piston means;

said cover tube is secured below said body portion; and said fluid inlet is located for directing said fluid into said cover tube to coact between said means for indicating the position of said second piston means and said cover tube to provide a damping to said first piston means.

3. A flowmeter as set forth in claim 2, wherein said means for indicating the position of said second piston means includes a magnet for movement in accordance with said second piston means;

said cover tube being non-magnetic to enable said magnet to provide a magnetic field external of said cover tube; and said means for indicating including a magnetic indicator disposed external the said cover tube for cooperation with said magnet for indicating the flow rate of the fluid.

4. A flowmeter as set forth in claim 3, wherein said fluid inlet is located for directing fluid into said cover tube by action of gravity to coact between said means for indicating and said cover tube to provide damping to said piston means.

5. A flowmeter as set forth in claim 4, including a damping liquid disposed in said cover tube for damping said piston means during the measurement of fluid gas in the flowmeter.

* * * * *